United States Patent [19]
Apkarian et al.

[11] Patent Number: 5,134,625
[45] Date of Patent: Jul. 28, 1992

[54] CONDENSED PHASE EXCIPLEX LASERS

[75] Inventors: Vartkess A. Apkarian; Mario E. Fajardo, both of Irvine; Lawrence Wiedeman, Los Angeles, all of Calif.; N. Schwentner, Berlin, Fed. Rep. of Germany

[73] Assignee: The Regents of the University of California, Berkeley, Calif.

[21] Appl. No.: 327,231

[22] Filed: Mar. 22, 1989

Related U.S. Application Data

[63] Continuation-in-part of Ser. No. 27,401, Mar. 18, 1987, abandoned.

[51] Int. Cl.$^5$ .............................................. H01S 3/22
[52] U.S. Cl. .................................... 372/57; 372/39; 372/51; 372/41
[58] Field of Search .................. 372/5, 40, 39, 51, 57, 372/41, 70, 109

[56] References Cited

U.S. PATENT DOCUMENTS

3,906,399  9/1975  Dienes et al. ...................... 372/53

Primary Examiner—Frank Gonzalez
Assistant Examiner—Susan S. Morse
Attorney, Agent, or Firm—Poms, Smith, Lande & Rose

[57] ABSTRACT

The invention provides a laser medium having improved photodynamical properties. The medium includes the condensed phase, namely solid or liquid phase, of a mixture of one or more rare gases and a halogen donor. The gases are first combined and then condensed to form the laser medium. A solid state rare gas crystal laser is also provided.

17 Claims, 8 Drawing Sheets

CONDENSED PHASE EXCIPLEX LASERS

RELATED APPLICATION DATA

This application is a Continuation-In-Part of application Ser. No. 07/027,401, filed Mar. 13, 1987, entitled "Condensed Phase Exciplex Lasers," listing Vartkess A. Apkarian, et al. as the inventors, and owned by the assignee hereof now abandoned.

FIELD OF THE INVENTION

This invention relates to exciplex lasers, and in particular to the media used in such lasers.

BACKGROUND OF THE INVENTION

Exciplexes are intermolecularly bound excited states of complexes with dissociative or only very weakly bound ground states. A very large class of systems can be classified as excited complexes or "exciplexes." The rare gas halides are singled out for the present application. The rare gas halide exciplexes are charge transfer complexes of rare gas atoms, to be designated by the symbol Rg hereafter, and halogen atoms, to be designated by X hereafter.

The prior art relating to exciplex lasers deals exclusively with gas phase lasers, and primarily with gas phase lasers that are electrically pumped (electron beams or electric discharges). Although high power performance is obtainable with present gas phase exciplex lasers of the type described by the Hutchinson U.S. Pat. No. 4,292,603 entitled "Exciplex Lasers" and in the Sze U.S. Pat. No. 4,301,425 entitled "XECL Avalanche Discharge Laser employing AR as a Diluent," there are significant limitations in some photodynamical parameters. Among the limitations in present gas phase exciplex lasers are: (1) the range of output wavelengths; (2) inefficiencies induced by collisional quenching of the upper laser state; (3) inefficiencies induced by parasitic absorptions in electrically discharged systems, which is the common mode of excitation; (4) relatively small gain coefficients due to the low number densities of exciplexes; and (5) the discrete nature of laser wavelengths and the virtual lack of tunability.

At present, dye lasers are the only broadly tunable coherent radiation sources. Dye lasers consist of a cell containing a dye molecule dissolved in an appropriate solvent. Laser action is induced by pumping the system with a powerful radiation source such as a flashlamp or another laser (quite commonly a gas phase exciplex laser). Dye lasers operate in the 320–950 nm spectral range. Tunability for a given dye solution is typically limited to about 30 nm. Dye molecules photodegrade when pumped with u.v. sources. Hence, there are no known tunable dye lasers or lasers of any kind that are tunable and operated in the deep u.v. or v.u.v. spectral range.

It would therefore be desireable to have a laser that would be more broadly tunable than existing dye lasers, that would extend the spectral range of existing lasers in particular to the u.v. and v.u.v. range and that would not degrade by the pump source.

SUMMARY OF THE INVENTION

The present invention in its broadest sense includes using the condensed phase mixture of a halogen atom or a halogen atom donor and a rare gas or several rare gases as the medium for an exciplex laser. In contrast to the prior art, the rare gases are first combined and then compressed to form a liquid or solid as the laser media. The media is then optically pumped. The techniques used for pumping of gas phase lasers, to which all prior art of exciplex lasers refer, are inapplicable for condensed phase lasers that are claimed here.

The term condensed phase will be used to refer to the solid or liquid state of matter.

With the present invention, the use of condensed phase exciplexes as laser media provides a marked improvement over the existing lasers in the photodynamical parameters mentioned above.

The advantages of using a solid or liquid phase medium in accordance with the present invention can be achieved with the entire family of rare gases and halogens or combinations thereof. The mixture of a rare gas or gases and halogens or halogen donors, condensed to the liquid or solid phase for use as a laser medium provides tunable radiation over a broad range of spectral regions including the v.u.v.-u.v. range where there are no tunable laser sources at present.

Additionally, according to the present invention, rare gas crystals or liquid solutions can be used to provide an optically pumped visible laser.

DETAILED DESCRIPTION OF THE INVENTION

Numerous schemes can be used for generating rare gas halide exciplexes in rare gas solids or liquids, i.e., in the condensed phase. A particularly useful scheme for the case of high efficiency solid phase lasers is the preparation of rare gas solids doped with atomic halogens. This can be achieved by in situ photodissociation of a halogen donor, such as HX or $X_2$ or any donor MX (in which M represents any atomic or molecular group), in a rare gas solid (or the solid of a mixture of rare gases). Such mixtures can be condensed by depositing the premixed gas on a cold surface or by condensing the gases under high pressure and low temperature in any conventional manner. In the case of such atomic solids, the exciplexes are formed by optically pumping the charge transfer transition between the rare gas and the halogen atom. This will result in the prompt formation ($\leq 10^{-12}$ sec) of the lowest energy exciplex, which in X:Rg solids corresponds to the triatomic $Rg_2^+X^-$; while in X:Rg:Rg' ternary mixtures (where Rg and Rg' refer to two different rare gases, e.g., Xe and Ar), the diatomic $Rg^+X^-$ exciplex is formed. The lowest energy exciplex $Rg_2^+X^-$ in X:Rg or $Rg^+X^-$ in X:Rg:Rg' relaxes radiatively due to the inefficient collisional quenching by atomic solids or liquids. This radiative transition terminates on the steeply repulsive branch of the ground state potential and is therefore broad. Moreover, the terminal state in all cases can be regarded as unbound. As a result, population inversion is always achieved and therefore lasing is possible. The very high packing of the exciplexes in condensed media, e.g., $10^{20} cc^{-1}$, result in very high gain coefficients.

In the case of liquid phase media, the exciplexes can be efficiently generated from molecular halogen donors by several optical and electron beam pumping schemes. Of these, the two-photon pumping schemes are most useful, in particular for the generation of radiation in the v.u.v.-u.v. range. A possible scheme which has been demonstrated by us is a two-photon cooperative charge transfer between the halogen donor and rare gas $[MX + Rg + 2h\nu \rightarrow Rg^+(MX)^-]$ followed by the prompt ejection of M (M=H, X or any halogen donor group) and relaxation of the diatomic exciplex $Rg^+X^-$, to form the lowest energy exciplex, $Rg_2^+X^-$, on a collisional timescale ($<10^{-12}$s). The subsequent photodynamics is the same as that described above for the case of atomic solids.

Figure 5:
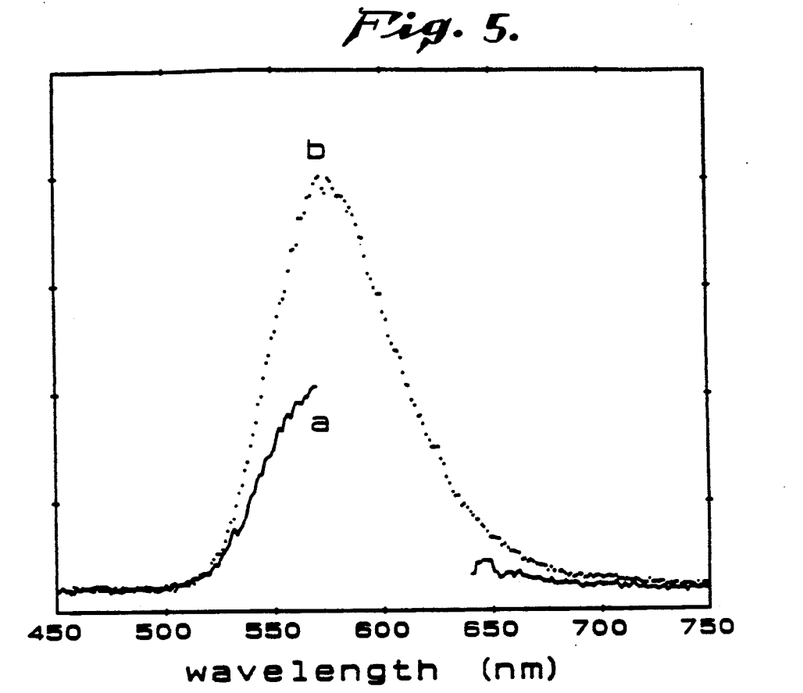
FIG. 5 is an emission spectrum for $Xe_2{}^+CL^-(4^2\Gamma)$ emission from a 1:100 Cl:Xe solid at 12° K. during 308 nm excitation, with a curve "a" being observed with a 590 nm dye laser dump beam and curve "b" being without the dye laser dump beam.
Figure 6:
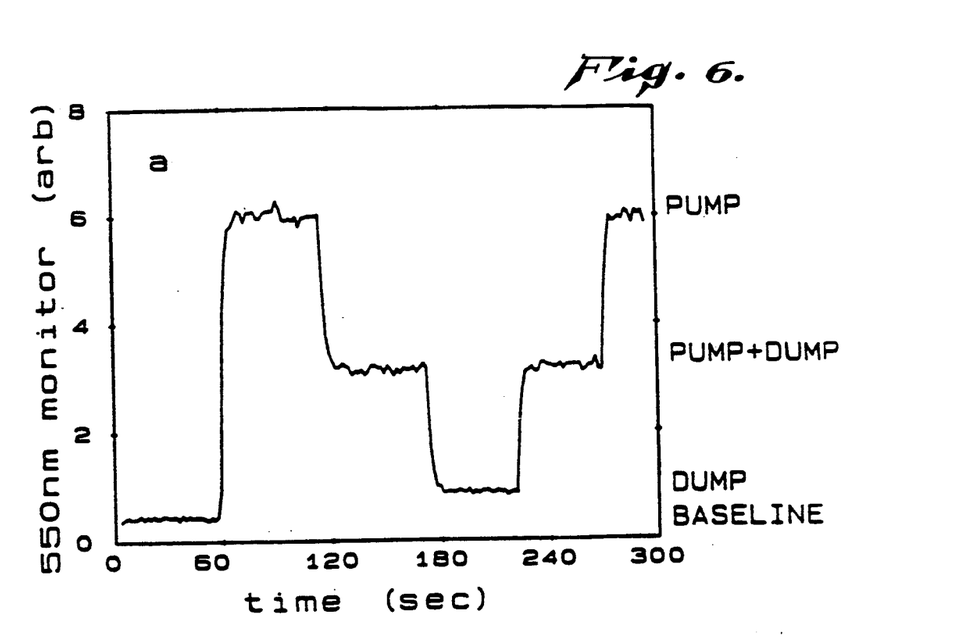
FIG. 6 is a boxcar average similar to FIG. 4 but from the same solid phase sample as FIG. 5.
Figure 7:
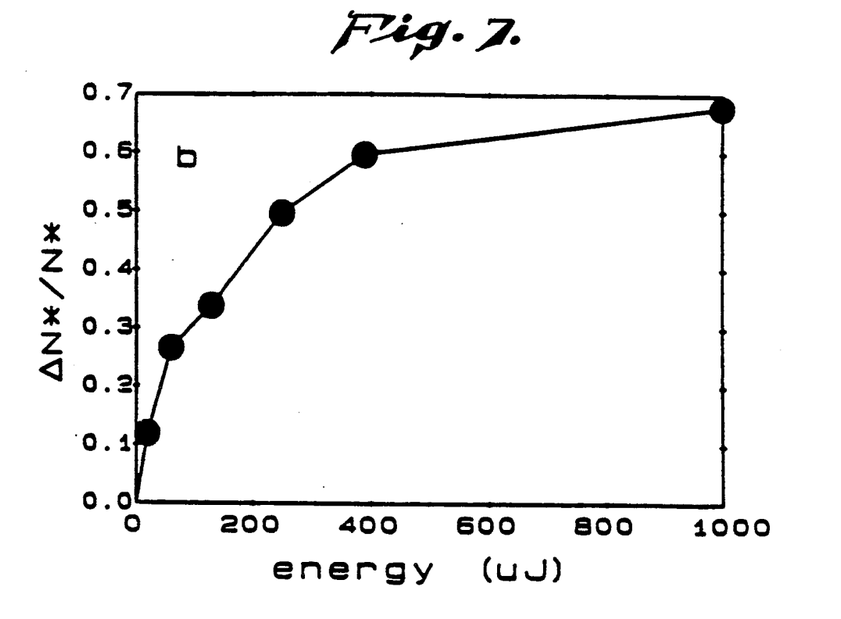
FIG. 7 shows the fraction of excited state population that undergoes stimulated radiative dissociation versus dump laser energy for the same solid phase sample as FIG. 5.

The above stated principles have been demonstrated experimentally in several solid and liquid phase systems. Solid phase demonstrations have been made in binary Cl:Xe solids, and ternary F:Xe:Ar solids. Cl doped xenon solids were prepared by photolysis of HCl or $Cl_2$ in a pulsed deposited matrix, but any standard matrix isolation technique could be used. The matrices were then extensively irradiated with the 308 nm output of an excimer laser, typically for one hour at a repetition rate of 5 Hz and a fluence of 100 mJ cm². The solid used for demonstration of stimulated emission was a 1:1000 Cl:Xe solid with an estimated thickness of 200 micrometers. The pump beam intensity was 1.3 mJ at 308 nm focused on a 10 mm² spot while the dye beam used to stimulate the emission at 580 nm had an intensity of 2 micro J, and was focused to a spot smaller than the pump beam, about 2 mm². The results of these experiments are shown in the emission spectrum shown in FIG. 5, the pump-dump signal levels shown in FIG. 6, and in FIG. 7 which shows the fraction of excited state population that undergoes stimulated radiative dissociation versus dump laser energy. The pump-dump measurements consist of monitoring the stimulation of emission by following the depletion of the spontaneous radiation. The gain measurements consist of directly monitoring the small signal amplification of injected radiation resonant with the $4^2\Gamma$ emission. Gain measurements were performed in the same system and a single pass gain of 25% was measured. Emission can be effectively stimulated using crystalline solids as gain media. Very large gain coefficients can be achieved in solids in contrast with the gas phase due mainly to their high packing densities.

Figure 8:
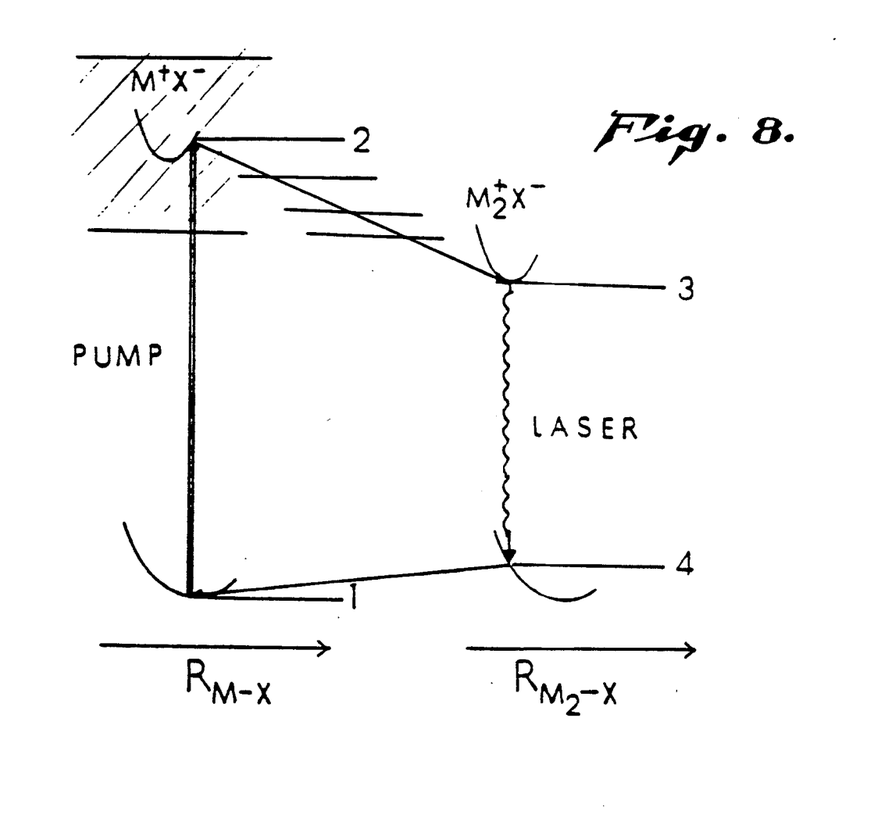
FIG. 8 is a representative energy diagram for a solid phase exciplex laser in accordance with the invention.

A representative energy level diagram for condensed phase exciplexes is shown in FIG. 8. State 1 is the ground covalent state (e.g., Cl/Xe). The double arrow shows the pump transitions which lead to a continuum of charge transfer states with the largest cross section near the $M^+X^-$ (B←X) resonance state 2 of FIG. 8. The pump states, state 2, relax within 1 psec to the lowest localized exciplex state, $Rg_2^+X^-(4^2\Gamma)$, state 3 of the figure. State 3 can only relax by radiation, shown by wavy arrow ($\tau=225$ for $Xe_2^+Cl-$). The relaxation leads to the repulsive branch of the ground state, ~1 eV above ground, shown as state 4. States 1, 2, 3, and 4 then fit the ideal four level laser description.

Laser demonstrations were also made in F:Xe:Ar crystals. In this case, laser action on three different bands of the diatomic XeF exciplex were demonstrated; these are: XeF (C→A) centered at 536 nm and determined to be tunable from 520-590 nm, XeF (B→X) at 409 and 411 nm, and XeF (D→X) at 286 nm tunable over a 6 nm range of the band center. These results will be further detailed below.

Liquid phase gain measurements were made in $Cl_2$:Xe solutions. The experimental setup basically included a high pressure cell having a 7 mm pathlength, using standard geometries and cooling techniques for the cell, and including a filling manifold for introducing the xenon and $Cl_2$. Typically, the cell and filling manifold were filled with 100-200 torr of $Cl_2$, then pressurized to 400 psi with xenon, left to equilibrate and subsequently cooled. The experiments focused on the 308-387 nm wavelength range for pumping of both the solid phase and liquid phase.

The results achieved with optical pumping of liquid phase xenon most clearly demonstrate the distinct advantages and broad applicability of the condensed phase exciplex laser of the instant invention. Two-photon cooperative pumping of the solution produced the $Xe_2^+Cl^-$ exciplex with high efficiency throughout the excitation range (308-387). The triatomic ($4^2\Gamma$) state is populated from the pumped level on a timescale faster than 10 psec, and relaxes radiatively with a lifetime of 225 nsec. This state then acts as the metastable upper level of the lasing transition. The transition terminates on the repulsive wall of the ground state.

Figure 1:
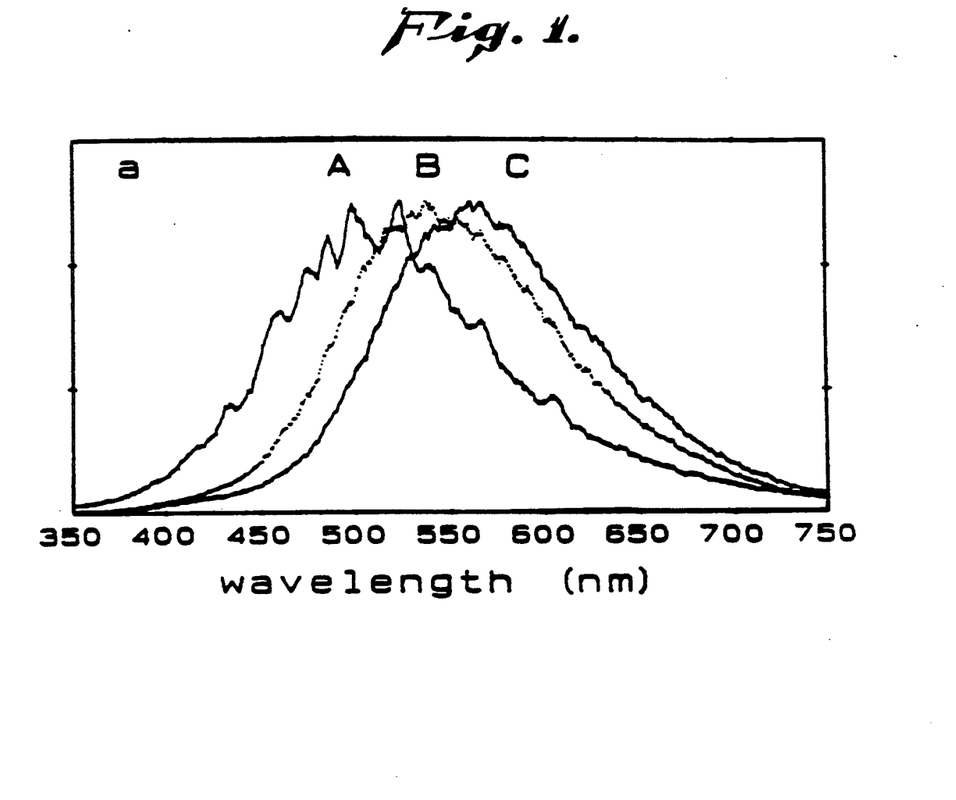
FIG. 1 shows the emission spectra of a 1:600 $Cl_2$:Xe sample, with a curve "A" being a gas phase spectrum and curves "B" and "C" being liquid phase spectra, normalized to the same height.
Figure 2:
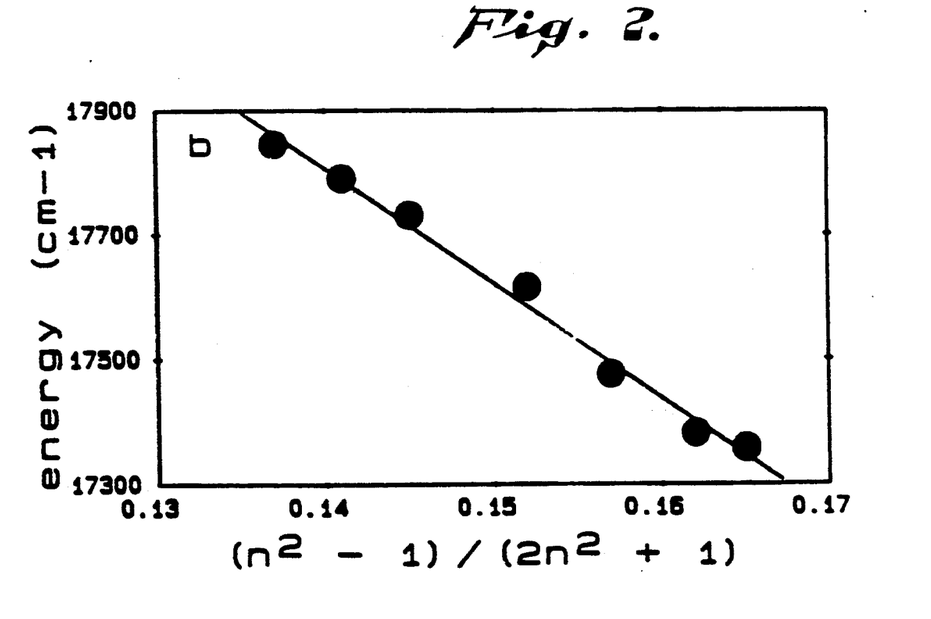
FIG. 2 is a plot of the shift of emission linecenter versus dielectric correction factor for seven liquid phase spectra spanning the temperature range from about 213° K. to about 160° K.
Figure 3:
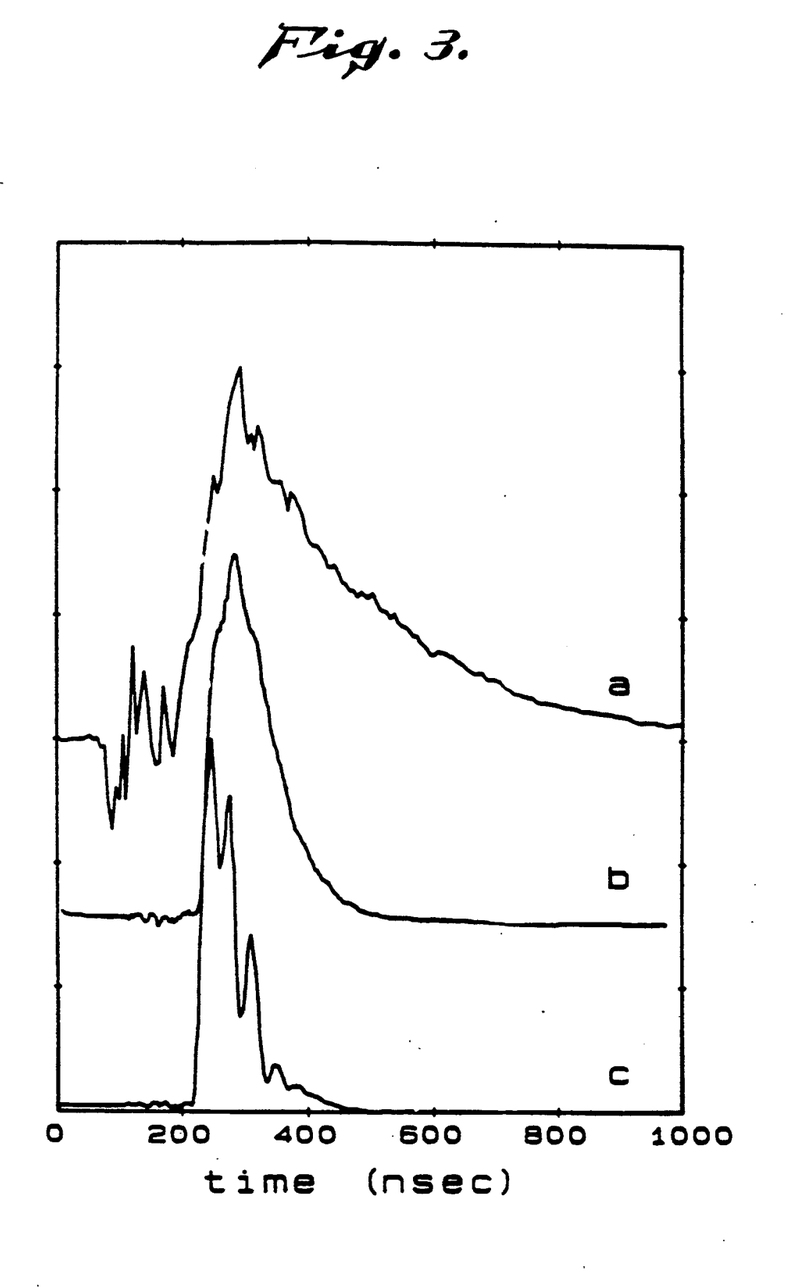
FIG. 3 is a graph showing the time evolution of $Xe_2{}^+Cl^-(4^2\Gamma)$ emission with curve "A" showing solid phase emission at a temperature of about 160° K., curve "B" showing liquid phase emission at a temperature of about 184° K., and curve "C: showing the pulse profile of the 308 nm excimer laser used to pump the $Cl_2$:Xe solution.
Figure 4:
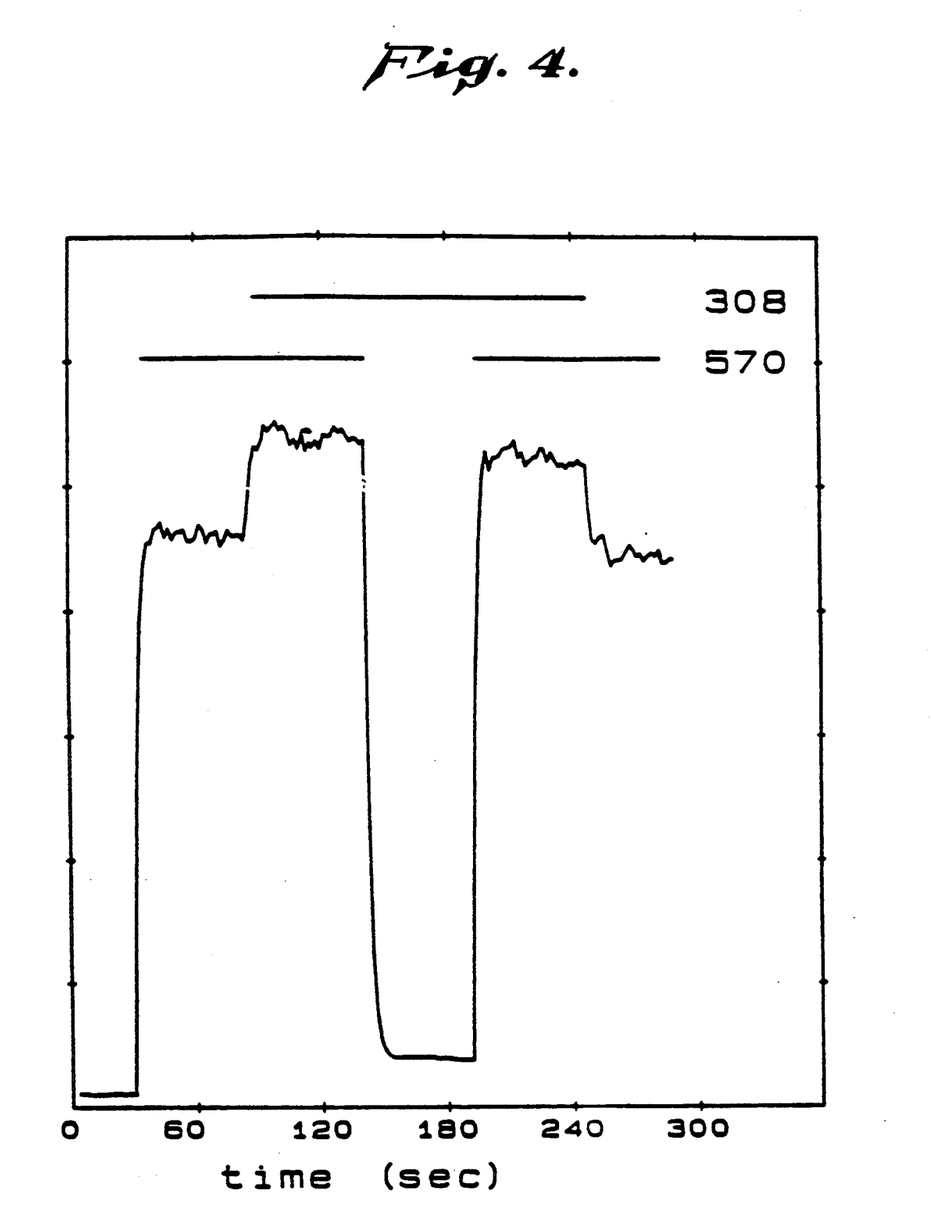
FIG. 4 is a boxcar averaged intensity level obtained during gain measurements in a 1:600 $Cl_2$:Xe liquid phase sample at a temperature of about 174° K., pump wavelength of 308 nm, and a probe wavelength of about 570 nm.

FIGS. 1-7 show the results of experiments using the above described setup. The time evolution of the emission spectra for liquid phase and solid phase $Xe_2^+Cl^-$ ($4^2\Gamma$) emission is shown in FIG. 3, where curve A shows solid phase emission at a temperature of about 160° K., curve B shows liquid phase emission at a temperature of about 184° K., and curve C shows a 308 nm excimer laser pulse profile. The emission is self stimulated-superradiant. Due to the large index of refraction of the liquid cell, the superradiant beam could be observed off axis from the pump beam direction showing that the cell acts as a thick parallel plate. The gain measurement results for a 1:600 $Cl_2$:Xe sample at T=174° K., $\lambda_{exc}=308$ nm, $\lambda_{probe}=570$ nm are shown in FIG. 4, where the sequence of laser beams applied is shown by the bars at the top of FIG. 4. A single pass gain of 11% was observed for a pump fluence of 100 mJ/cm with the liquid phase media.

FIGS. 2 and 3 also relate to the liquid phase media. FIG. 2 is a plot of the emission linecenter versus dielectric correction factor for seven liquid phase spectra spanning the temperature range from about 213° K. to 260° K. The figure clearly indicates that beside the dispersive tunability within the broad exciplex emission, the entire emission band can be temperature or pressure tuned. The single $Xe_2^+Cl^-$ system could then be used to generate laser action over the entire visible spectrum.

Condensed phase exciplexes in accordance with the instant invention possess the ideal photodynamical parameters to qualify them as highly versatile laser media. Solar pumped operation of the atomic solids is an example. Very compact design or complete tunability throughout the u.v. vis spectrum and permanently sealed or in situ regenerable applications are other application examples.

The principles described above are applicable to the entire family of rare gas halides. Given the known photodynamical parameters, it is possible to predict a wide variety of laser candidates. In the table below some representative examples, to be used in the liquid phase, by cooperative pumping are listed. The table includes the mixture, components, the lasing state, the wavelength range of lasing and possible pumping sources.

| Mixture | Laser State | Wavelength Range (nm) | Pump Lasers |
|---|---|---|---|
| $Cl_2$:Xe 1:1000 | $Xe_2CL_-(4^2)$ | 400-700 | $N_2$, YAG/3, XeCl |
| $F_2$:Xe 1:1000 | $Xe_2F^-(4^2)$ | 500-800 | $N_2$, YAG/3, XeCl |
| $Cl_2$:Kr 1:1000 | $Kr_2Cl^-(4^2)$ | 300-400 | XeCl, KrF, YAG/4 |
| $Br_2$:Kr 1:1000 | $Kr_2Br_-(4^2)$ | 210-240 | XeCl, KrF, YAG/4 |
| $Cl_2$:Ar 1:1000 | $Ar_2Cl^-(4^2)$ | 230-270 | KrF, ArF |
| $F_2$:Ar 1:1000 | $Ar_2F^-(4^2)$ | 260-310 | KrF, ArF |
| $F_2$:Ne 1:1000 | $Ne_2F^-(4^2)$ | 130-160 | $F_2$ |
| $F_2$:Ar:Ne 1:1:100 | $Ar+F^-(B)$ | 185-210 | KrF, ArF |
| $Cl_2$:Ar:Ne 1:1:100 | $Ar^+Cl^-(B)$ | 160-190 | K |
| $F_2$:Xe:Ar | XeF(C) | 520-590* | XeCl, or XeF* |
|  | XeF(B) | 409-411* | KrF* |
|  | XeF(D) | 283-289* |  |

*Demonstrated

The pumping sources that were chosen are readily available laser systems. The mixes that were chosen cover the entire spectrum from 130-800 nm. Other wavelengths and combinations are possible. Other pumping mechanisms (e.g., electron beam) are possible. The above list is by no means exhaustive.

Exciplexes are intermolecularly bound excited states with dissociative ground states. This includes a very large class of systems of which the charge transfer states of rare gas halides are singled out for the present application. By condensed phase is meant solid or liquid phases, with both media being appropriate as lasers of different designs. The parameters that make these systems ideal four-level lasers are:

1. Atomic Solids a. Continuous excitation spectra that typically start in the mid-visible range and stretch throughout the u.v. Very large absorption cross sections due to the charge transfer nature of the absorption transitions;

b. Localized lowest exciplex state, $Rg_2^+X^-$ or $Rg^+X^-$ which can only relax by radiation (the absence of non radiative relaxation for the lowest charge transfer state) and therefore near unity quantum efficiency in light conversion;

c. Very fast non radiative relaxation of the upper excited states to the lowest exciplex state;

d. Very high packing densities of the exciplexes in rare gas solids or liquids ($\geq 10^{20}$cc$^{-1}$) and therefore very high gain coefficients; and e. Broad homogeneous emission lineshapes therefore tunable by dispersive optics.

2. Liquid Phase a. Efficient two-photon cooperative photogeneration of exciplexes in a spectral region where there are conveniently accessible pump sources;

b. Absence of collisional quenching by solvent;

c. Fast relaxation of the pumped state to the upper laser level, therefore high quantum conversion efficiency;

d. Broad emission lines that can be temperature or pressure tuned;

e. Completely impervious to photodegradation; and f. Convenient design of laser in standard dye laser geometries of transverse or longitudinal pumping.

A Solid State Rare Gas Halide Laser

The information provided above leads to the following conclusions.

First, rare gas solids doped with atomic halogens can be prepared by in situ photolysis of molecular halogens and hydrogen halides. Such solids are ideally suited as optically pumped laser media since high densities of rare gas exciplexes ($Rg^+X^-$ in doubly doped systems and $Rg_2^+X^-$ in a single rare gas host) could be generated, and the nonradiative decay mechanisms present in the gas phase are effectively eliminated. Indeed, very large gain coefficients are demonstrated over the $Xe_2^+Cl^-(4^2\Gamma \rightarrow 1^2\Gamma)$ transition in Cl doped thin films of solid xenon.

Second, in the case of liquids, the usual optical pumping mechanism relies on two-photon charge transfer transitions for which high pump power densities are required. The attainable exciplex number densities in liquids are limited by the damage threshold of window materials, and nonradiative quenching of the exciplexes due mainly to exciplex-halogen donor collisions. Problems associated with windows are eliminated by resorting to free standing crystals. Moreover, spatial localization in solids, precludes exciplex-exciplex and exciplex-halogen donor quenching channels.

As demonstrated below, $Rg^+X^-$ exciplex formation takes place in doubly doped rare gas crystals with high efficiency even at large dilution. Crystals of sufficient optical quality for lasing can be grown in a convenient way. Gain saturation is obtained at moderate optical pump powers. The deposited energy is extracted as laser radiation with a quantum efficiency near unity as stored energy density of $10^5 J/1$. An extension to shorter wavelengths seems to be feasible by choosing exciplexes with rare gases of lower and halogens with high atomic weight.

The crystals for the laser according to the present invention were prepared in the following manner. The crystal used was Ar and was doped with Xe and $F_2$. A plexiglass box of $20\times6\times10$ mm$^3$ volume was pressed against a copper block held at 20K by a closed cycle refrigerator. The crystal was grown in the box in 15 min by deposition of the gas mixture at a pressure of 100–400 torr. The cryostat was then raised until the crystal stands free in the vacuum of the chamber.

Optically clear crystals were prepared for $F_2$:Xe:Ar compositions of 1:1:3000. Photoconversion of $F_2$ to XeF leads to a cone of absorbing centers with a volume of $2\times0.5\times6$ mm$^3$ determined by the pump geometry; see FIG. 9. The excitation density along the cone was visually even, indicating a moderate attenuation of the pump beam. The cone however, remained optically clear for visible radiation. Due to scattering of radiation at the crystal/vacuum interfaces, the propagation of the pump beam in the crystal could easily be located. Scattering at the surfaces in the case of a transmitted He:Ne laser beam appear as weak halos.

Figure 9:
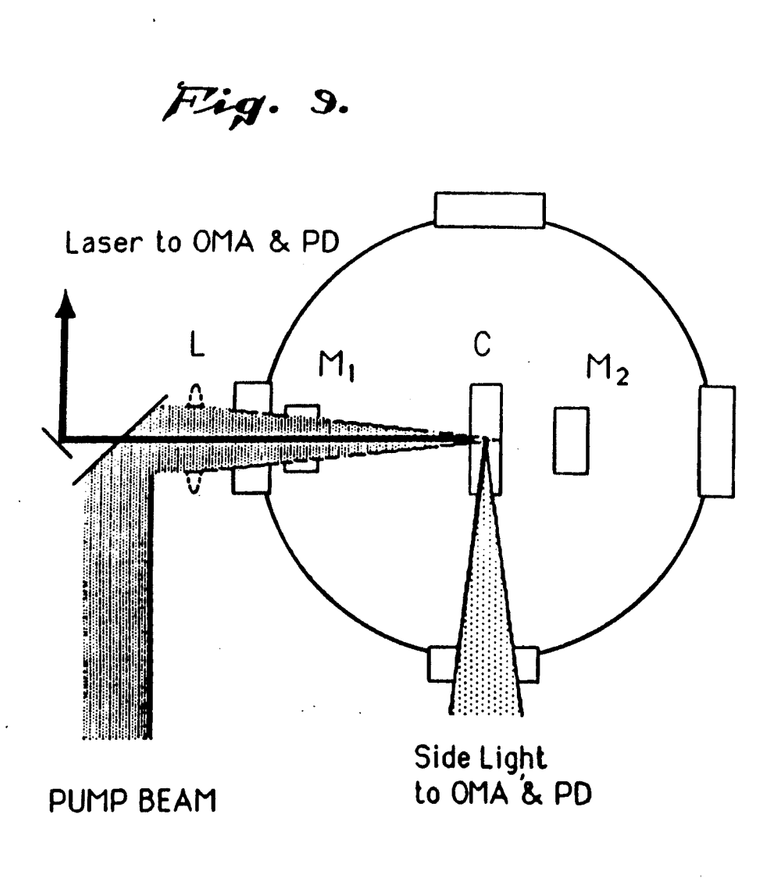
FIG. 9 is an experimental diagram. The free standing crystal (C) and cavity mirrors (M1 and M2) are contained in the vacuum chamber. The crystal is pumped with a gas phase XeF laser, which is focused on the crystal with a 20 cm f.1 lens (L) from outside the chamber. Fluorescence is monitored as side-light while the on-axis beam is monitored through appropriate filters. The time evolution is monitored with a photodiode (PD) while the spectral distributions are recorded with an optical multichannel analyzer (OMA).

A gas phase XeF laser (Lambda Physik EMG 201) operating at 351 nm was used as the pump source. The pump beam was focused by a 5 cm diameter, 20 cm focal length lens along the longitudinal axis of the cavity (FIG. 9). The cavity was formed by a pair of plane dielectric mirrors of 1.25 cm diameter installed in the vacuum chamber. The mirror on the pump side was placed at 7 cm from the crystal, while the output coupler was placed at a distance of 2 cm on the opposite side. They were mounted on a bellows assembly that allows for alignment via external micrometers. Both mirrors had transmissions of 84% at 351 nm, and reflectivity of 30% at 410 nm. The pump mirror was coated for maximum reflectivity (>99.9%) at 500 nm, its re-
flectivity at 530, 540, 550, and 600 nm is 99.7%, 97%, 62% and 27% respectively. The output coupler mirror was coated for 95% reflectivity at 532 nm. Its reflectivity at the same wavelengths was 94%, 93.4%, 92% and 61%.

The time evolution and the wavelength distribution of the emitted light was monitored either along, or perpendicular to the laser axis. They were alternatively recorded either by a fast Si PIN photodiode combined with a 100 MHz digitizing scope (Tektronix 2430), or a 0.25 m monochromator equipped with gratings of 1200 & 140 grooves/mm and a gated intensified diode array (OMA III).

With this arrangement and a crystal with composition of 1:1:3000, Xe:$F_2$:Ar, the results were as follows. Since the $F_2$ absorption coefficient at 351 nm is $\sim 1\times10^{-21}$cm$^2$, the crystal was originally nearly transparent to the pump laser. With irradiation, the XeF B and C emissions developed and the pump beam was attenuated. The growth of the XeF population was followed by monitoring the fluorescence intensity as a function of time. After several thousand pulses the photoconversion was complete, i.e., a plateau was reached in the growth curve of the exciplexic emission intensity.

Figure 10:
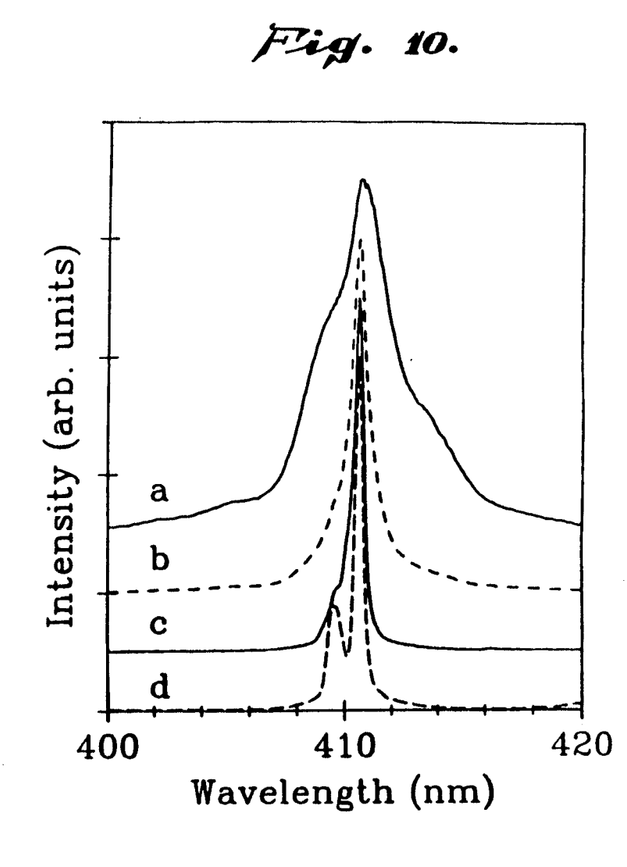
FIG. 10 shows normalized emission spectra of XeF (B→X) transition in solid argon. 10(a) is the fluorescence spectrum, collected as side-light under low energy pumping conditions, shows a progression originating from v'=0 of the B state. 10(b) is the on-axis emission showing line narrowing due to stimulated emission at a pump energy of 18 mJ. 10(c) shows lasing on the largest member of the progression at 44 mJ of pump energy. 10(d) shows on-axis emission showing laser action on both v'=0 and 1 levels of the B state at a pump energy of 44 mJ.
Figure 11:
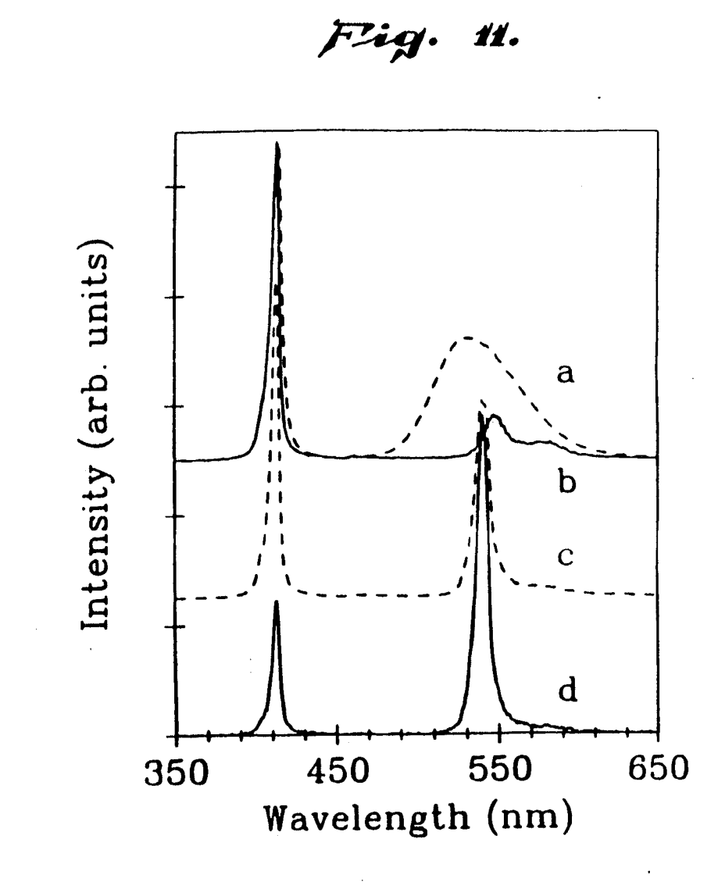
FIG. 11 shows normalized emission spectra of XeF (B→X) and (C→A) transitions centered at 411 nm and 536 nm respectively. 11(a) is side-light fluorescence. 11(b) is on-axis emission at a pump energy of 12 mJ. The degraded C→A band is due to dielectric coating of the cavity mirror (R≥99.9% at 500 nm). 11(c) is lasing on both bands at a pump energy of 51 mJ, condition under which the B→X laser is more intense. 11(d) is laser action at 76 mJ of pump energy, shows saturation of the B→X laser. The C→A laser is now more intense.

Fluorescence spectra obtained at low excitation powers and in the absence of cavity mirrors are shown in FIGS. 10a and 11a. The 411 nm band corresponds to the bound-bound $B(\frac{1}{2})\rightarrow X^2\Sigma^+$ transition. The broad band centered at 536 nm is identified as the diatomic XeF $C(3/2)\rightarrow A^2\pi$ transition. Both transitions are red shifted relative to their respective gas phase values due to solvation of these ionic states in the dielectric of the host. Excitation at 351 nm, leads mainly to absorption on the XeF (B←X) transition. The C state was populated by internal conversion from the B state. Although the exact mechanism is not well understood, it is believed that the initial branching ratio is influenced by the vicinity of F or $F_2$ species at the photogenerated XeF centers. Given the lifetimes and lineshapes, stimulated emission cross-sections, $\delta_s$, of $10^{-15}$ cm$^2$ and $10^{-17}$ cm$^2$ can be derived from the B→X and C→A transitions in solid Ar (Table 1). The overall C:B intensity ratios, areas of time integrated fluorescence bands, start at 20:1 and reach a ratio of 7:1 at completion of the photoconversion. The steady state B population is further reduced by a factor of 3 due to its short lifetime in comparison to the pump pulse duration. These steady state population ratios, $\gamma$, are given in Table 2 below. The product, $\gamma \cdot \sigma_s$ which determines the relative amplification coefficients, favors B by a factor of 1.7 to 3.3 depending on the extent of conversation (Table 1). The difference between B or C is not very large, therefore the resonator reflectivities should determine the transition to be amplified. Note however, that a factor of 20 more power should be extractable from C state due to its large population.

|  | Pump Energy | Transition | |
|---|---|---|---|
|  | [mJ] | (B X) | (C A) |
| $\tau$[ns] |  | 6 | 120 |
| fwhm [nm] |  | 2.4 | 64 |
| $\sigma_s$[cm$^2$] |  | $10^{-15}$ | $10^{-17}$ |
| $\chi$ |  |  |  |
| early |  | $1.7 \times 10^{-2}$ | 1 |
| late |  | $3.3 \times 10^{-2}$ | 1 |
| $\gamma\sigma_s$[cm$^{-2}$] |  |  |  |
| early |  | $1.7 \times 10^{-17}$ | $10^{-17}$ |

-continued

| Pump Energy | Transition | |
|---|---|---|
| [mJ] | (B X) | (C A) |
| late | $3.3 \times 10^{-17}$ | $10^{-17}$ |
| fwhm [nm] 29 | 0.6 | |
| 44 | 0.4 | |
| 51 | | 10.6 |
| 76 | | 8.8 |
| .1    29 | 16 | |
| 44 | 36 | |
| 51 | | 37 |
| 76 | | 53 |
| $a_{max}[cm^{-1}]$ | 170–330 | 100 |

A series of gain measurements were performed prior to installation of the cavity mirrors. This was achieved by synchronizing the output of a pulsed dye laser with the pump laser and overlapping the two beams in the crystal in a counterpropagating geometry. Small signal amplification of greater than 100% was observed at all studied wavelengths, from 520 to 590 nm over the C→A band, and at several wavelengths near the maximum of the B→X transition. Amplification by a factor of ≧10 was observed at the emission maxima of both B and C states. With 8 mJ of pump power, up to 30% of the deposited photons could be extracted near the C→A band maximum. During these measurements amplified spontaneous emission was evidenced by line-narrowing along the pump direction.

Figure 12:
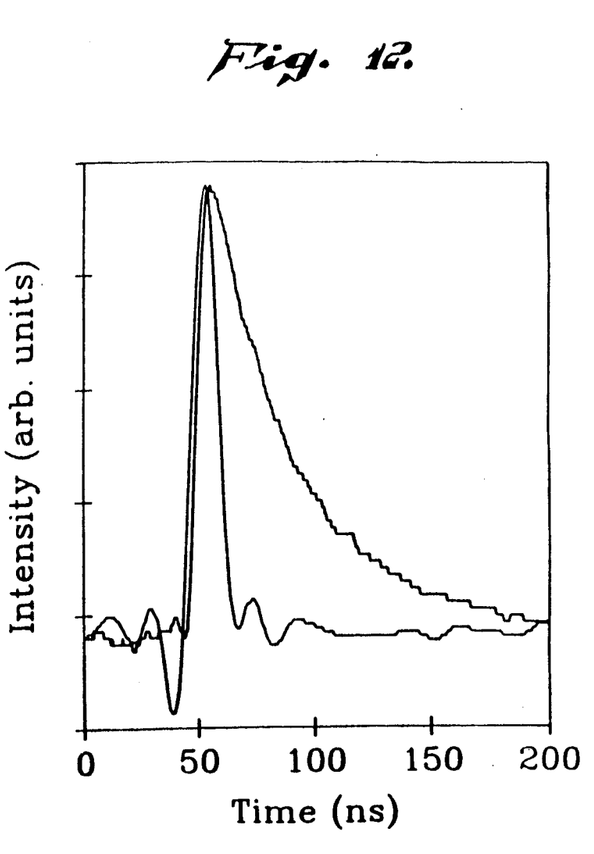
FIG. 12 shows time evolution of the C→A emission. Shown are the side-light fluorescence (averaged over 8 shots) with a 120 ns lifetime, and the on-axis laser emission (single shot) at a pump energy of 51 mJ.

When the crystal was pumped with cavity mirrors in place, both green (C→A) and purple (B→X) laser beams were observed along the cavity axis, in both directions. The divergences of the observed beams of ~20 mrad, closely followed the excited volume dimensions. When a fresh spot was irradiated, lasing started on the green band, which is preferred by the cavity reflectivity. With extended irradiation near the threshold of the green laser, the purple beam switched on, due to the increase in the B/C ratio. The intensity in the amplified beam increased exponentially with pump energy. An increase of more than four orders of magnitude was observed in the amplified purple beam, for an increase in the pump energy from 2.5 to 25 mJ. Saturation was observed near this upper limit. The C→A lifetime was dramatically shortened and became indistinguishable from the temporal profile of the pump beam above 50 mJ, see FIG. 12. Lifetime shortening of the B state is less obvious due to its short radiative relaxation time in comparison to the pump pulse width.

Lifetime shortening was accompanied by a narrowing of the emission bands. A sequence of normalized emission spectra as a function of pump power are shown in FIG. 10 for the B→X transition. The vibrational progression observed in fluorescence (10a) disappeared as the pump power was increased and at intermediate powers only the strongest member of the progression was amplified (10b). At high pump powers (FIGS. 10c and 10d), a second amplified band on the high energy side of the main laser transition was occasionally observed (10d). This secondary band was not part of the vibrational progression observed in the fluorescence spectrum which is dominated by v'=0→v" transitions. The spacing of the 60 cm$^{-1}$ between the two lasing lines indicates that it originated from the v'=1 level of the B state. Evidently the gain is large enough such that relaxation via stimulated emission competes with non-radiative relaxation of the v'=1 state.

Estimates of the gain coefficients can be obtained from the observed line narrowing. The spectral distribution of the amplified intensity can be expressed as:

$$I(\lambda)d\lambda = A\, e^{-\frac{\Delta\lambda^2}{2\sigma^2}} (e^{a_0 l \exp(-\frac{\Delta\lambda^2}{2\sigma^2})} - 1) d\lambda \quad (1)$$

in which $a_0$ is the gain coefficient at line center, the band profile is assumed to be Gaussian of width $\sigma$, and l represents the length of the active medium. The fwhm of the central band in the B→X progression decreased from its fitted value of 2.4 nm to 0.4 nm under strong amplification conditions. In this limit, the gain length product is well approximated by:

$$a_0 l = \frac{\ln 2}{1 - \exp\left(-\ln 2 \left(\frac{\Gamma}{\Gamma'}\right)^2\right)} \quad (2)$$

in which $\Gamma$ and $\Gamma'$ are fwhm for the amplified and fluorescence profiles respectively. The $a_0'$ values at different pump powers are collected in Table 2 for both purple and green beams.

The fluorescence spectrum shown in FIG. 11a was modified when monitored along the cavity mirrors. In trace b of FIG. 11 the on-axis spectrum as observed from the pump side is shown. The dielectric coating on this side was maximized for 99.9% reflection at 500 nm, hence the blue degradation of C→A band. The observed structure on the red side was strictly due to the wavelength dependence of the mirror reflectivity. Increasing the pump power led to lasing on the B→X transition (Table 2). Upon increasing the pump energy to 50 mJ, lasing on the C→A transition was observed as evidenced by the strong line narrowing (11c). The line is centered at the maximum of the gain profile. In accordance with the smaller $\gamma \cdot \sigma_s$ value, the threshold for the C→A laser occurred at higher pump energies than that of the B→X. At higher pump energies, the B→X laser saturated and the C→A laser intensity exceeded it due to the larger population in the C state (FIG. 11d). The gain-length product, $a_0'$, calculated from the line narrowing (eq. 2) reaches very large values of 30–50 (Table 2).

It is informative to compare the observed laser parameters to the maximal values possible for this system under ideal conditions. For a dilution of 1:3000, if it is assumed that every Xe atom forms an excited XeF exciplex, the attainable number density, N is $1 \times 10^{-19} cm^{-3}$. Assuming an optimal adsorption probability of unity, a minimal pump flux of 50 mJ over the pump area of 1 mm$^2$ is necessary for saturation of the centers. With the assumption of unit quantum efficiency, the expected maximal gain coefficients, $a_{max} = \gamma \sigma_s N$, are 100 cm$^{-1}$ and 300 cm$^{-1}$ for the C→A and B→X transitions respectively (Table 2). Given the resonator configuration, and losses due to scattering at the crystal interfaces, it may be assumed that the number of round trips in the cavity is small, and that the effective gain length is ~1 cm. This assumption is experimentally justified by the fact that the laser intensity is not sensitive to minor detuning of the cavity mirrors. It then follows that the observed values are very near the maximal possible for the present geometry (Table 2).

This comparison has several important implications. First, it requires that essentially all Xe atoms form XeF exciplexes. Thus the $F_2$ dissociation has to be complete. In addition each F atom has to reach a place adjacent to an Xe atom to form the exciplex. The last condition is by no means trivial since the mean separation between Xe and F will be of the order of 15 nearest neighbor separations or 56 Å for a dilution of $3 \times 10^{-4}$.

Second, the overall quantum efficiency has to be close to unity: the deposited energy can be extracted as laser radiation with about unity efficiency.

Third, amplification of spontaneously emitted photons within the excited volume $$\frac{N \cdot L}{T \cdot C}$$

in the amplification cone $d\Omega$ should lead to a depletion of the excited state population at $\alpha_o'$ values of 10 for the 411 nm band and about 13 for the 536 nm band according to eq. 1. This predicted saturation is observed for the 411 nm band around pump powers of 15 to 25 mJ in agreement with the estimate (Table 2). The strong depletion of the excited state by stimulated emission is further substantiated by measurements in the direction perpendicular to amplification. The side-light intensity of the 530 nm band is reduced by at least a factor of 5 for an increase of the pump power from 18 mJ to 43 mJ. In addition the spectra show that a significant amount of the side-light at high pump power is scattered amplified radiation and the real fluorescence content is even smaller. The system can indeed be described as an ideal four level laser.

Figure 13:
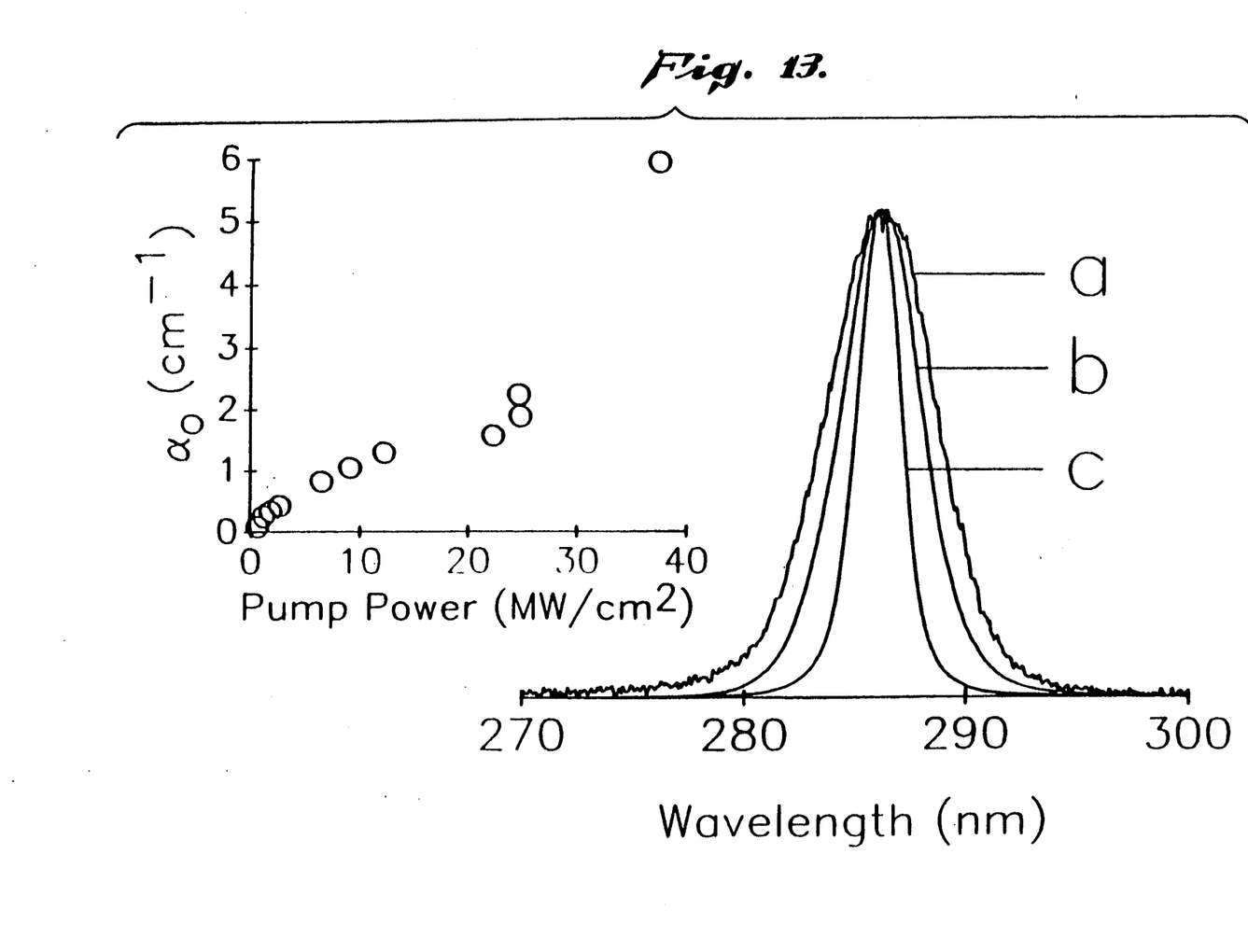
FIG. 13 shows line narrowing of XeF (D→X) transition due to amplified spontaneous emissions. In the inset to the same figure, the measured gain coefficient is plotted as a function of pump power.

In a second demonstration of lasing, the F:Xe:Ar crystals were pumped by the 248 nm output of a gas phase KrF laser. This excitation leads to the population of XeF (D) state predominantly. When pumped with intensities 10 MW/cm$^2$, line narrowing of the XeF (D→X) transition is observed in the absence of cavity mirrors. These results are illustrated in FIG. 13. From the line widths, gain coefficients as a function of input intensity is derived (inset to FIG. 13). Due to the very large gain of the system ($\sim 6$ cm$^{-1}$), this transition undergoes self stimulated emission even in the absence of mirrors—a superradiant u.v. laser.

Although the invention has been described in detail with particular examples and embodiments, various changes and modifications can be made without departing from the principles of the invention, the scope of which is defined by the following claims:

What is claimed is:

1. An exciplex laser having as its laser medium the condensed phase of a mixture of one or more rare gases and one or more halogen donor(s), said mixture being formed by first combining then condensing said gases and said donor.

2. The condensed phase exciplex laser of claim 1 wherein said mixture is in the liquid phase.

3. The condensed phase exciplex laser of claim 1 wherein said mixture is in the solid phase.

4. The condensed phase exciplex laser of claim 1 wherein said halogen donor is a chlorine donor.

5. The condensed phase exciplex laser of claim 1 wherein said rare gas is mostly Xe.

6. The condensed phase exciplex laser of claim 2 wherein said halogen donor is a chlorine donor.

7. The condensed phase exciplex laser of claim 2 wherein said rare gas is mostly Xe.

8. The condensed phase exciplex laser of claim 3 wherein said halogen donor is a chlorine donor.

9. The condensed phase exciplex laser of claim 3 wherein said rare gas is mostly Xe.

10. The condensed phase exciplex laser of claim 1 including means for optically pumping said laser medium.

11. An exciplex laser having as its laser medium a crystal condensed from a mixture of one or more rare gases and one or more halogen donors.

12. An exciplex laser according to claim 11, wherein said rare gases a combination of Xe, $F_2$, and Ar.

13. An exciplex laser according to claim 11, wherein said crystal is F:Xe:Ar.

14. An exciplex laser according to claim 11, wherein said crystal is crystalline argon and lasing is achieved over the XeF transitions in argon.

15. An exciplex laser according to claim 11, wherein said crystal is crystalline krypton.

16. An exciplex laser according to claim 11, wherein said crystal is crystalline xenon.

17. An exciplex laser according to claim 11, wherein said crystal is crystalline neon.

* * * * *